US011288152B2

(12) United States Patent
Höfig et al.

(10) Patent No.: US 11,288,152 B2
(45) Date of Patent: Mar. 29, 2022

(54) METHOD FOR RISK-BASED TESTING

(71) Applicant: Siemens Aktiengesellschaft, Munich (DE)

(72) Inventors: Kai Höfig, Munich (DE); Peter Zimmerer, Munich (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 16/751,230

(22) Filed: Jan. 24, 2020

(65) Prior Publication Data
US 2020/0310938 A1   Oct. 1, 2020

(30) Foreign Application Priority Data

Mar. 29, 2019 (EP) .................... 19166270

(51) Int. Cl.
*G06F 11/263* (2006.01)

(52) U.S. Cl.
CPC .................... *G06F 11/263* (2013.01)

(58) Field of Classification Search
CPC .. G06F 11/079; G06F 11/263; G06F 11/3414; G06F 11/3447; G06F 11/3452; G05B 23/0283
See application file for complete search history.

(56) References Cited

U.S. PATENT DOCUMENTS

| | | | | |
|---|---|---|---|---|
| 6,909,994 B2* | 6/2005 | Johnson | ............. | G05B 23/0278 702/185 |
| 7,197,427 B2* | 3/2007 | Noonan | ............. | G06F 11/3409 702/179 |
| 7,865,333 B2* | 1/2011 | Becker | ............... | G05B 23/0278 702/183 |
| 9,430,311 B2* | 8/2016 | Lee | ..................... | G06F 11/0703 |
| 9,483,342 B2* | 11/2016 | Hofig | .................... | G06Q 10/04 |
| 2014/0278732 A1 | 9/2014 | Brandts et al. | | |
| 2018/0060832 A1* | 3/2018 | Korsedal, IV | ......... | G06Q 10/20 |

OTHER PUBLICATIONS

Puschel, G., Götz, S., Wilke, C., Piechnick, C. and Aßmann, U.; "Testing Self-Adaptive Software: Requirement Analysis and Solution Scheme;" International Journal on Advances in Software, 2628, vol. 7, Nos. 1 and 2; Published in 2014; pp. 88-100.*
Extended European Search Report dated May 16, 2019 for Application No. 19166270.9.

* cited by examiner

*Primary Examiner* — Joseph R Kudirka
(74) *Attorney, Agent, or Firm* — Schmeiser, Olsen & Watts LLP

(57) ABSTRACT

Provided is a computer-implemented method, the method including storing a meta-model in a computer-readable storage medium, wherein the meta-model includes at least one risk element, at least one test element and at least one objective element, and associations between the elements, wherein each risk element is associated with one or more objective elements, and/or each risk element is associated with one or more test elements, wherein at least one element of the elements and/or at least one association has at least one associated risk-related parameter. Also provided is a corresponding computer program product and system.

14 Claims, 3 Drawing Sheets

METHOD FOR RISK-BASED TESTING

CROSS-REFERENCE TO RELATED APPLICATIONS

This application claims priority to European Application No. 19166270.9, having a filing date of Mar. 29, 2019, the entire contents of which are hereby incorporated by reference.

FIELD OF TECHNOLOGY

The following relates to a computer-implemented method for risk-based testing, a corresponding computer program product and a corresponding system.

BACKGROUND

The approach risk-based testing is well known from conventional art, according to which, risk-based testing is a methodology to prioritize test cases according to their risk. The higher the risk of a failure covered by a certain set of test cases, be it in the terms of safety, reliability, availability or any other quality affecting property of a system, the higher such a set of test cases is prioritized.

Thereby, the risk-based testing aims at reducing the number of test cases to a set that is of high importance as well as reducing the test activities where not necessary.

Usually, risk-based testing includes the following aspects:
1) Risk Identification In this process, the risks are identified and categorized, a draft register of risks are prepared, risk sorting is done to identify the significant risks.

2) Risk Analysis

Risk response involves formulating the test objectives from the risks and selecting appropriate techniques to demonstrate the test activity/test technique to meet the test objectives.

3) Risk Response Planning

Document dependencies, requirements, cost, time required for testing, etc. are considered to calculate the test effectiveness score.

4) Test Scoping

Test scoping is a review activity that requires the participation of all stakeholders and technical staff. It is important to adhere to the agreed scope of risks. These risks need to be addressed by testing, and all members agree with the responsibilities assigned to them and budget allocated for these activities.

5) Test Process Definition

After the scope of testing has been finalized the test objectives, assumptions, dependencies for each test stages has to be compiled in the standard format.

Usually, a list including a risk id, a risk description, a risk probability, a risk consequence, risk exposure, effectiveness of a test and a resulting test priority number is manually maintained considering the aforementioned aspects. The manual approach, however, is a complex and time-consuming task. Further, the resulting manually maintained list, however, is error prone and does not provide a digital format to combine risk-based testing within a computer system.

SUMMARY

An aspect relates to a method for risk-based testing in an efficient and reliable manner.

This problem is according to one aspect of embodiments of the invention solved by a computer-implemented method for risk-based testing, the method comprising:
a. storing a meta-model in a computer-readable storage medium, wherein
b. the meta-model comprises at least one risk element, at least one test element and at least one objective element, and associations between the elements, wherein
c. each risk element is associated with one or more objective elements, and/or each risk element is associated with one or more test elements, wherein
d. at least one element of the elements and/or at least one association has at least one associated risk-related parameter.

Accordingly, embodiments of the invention are directed to a method for risk-based testing. A meta-model is stored in a computer-readable storage medium. The meta-model comprises elements or entities and associations or relations between the elements. The elements include at least one risk element, at least one test element and at least one objective element. Each risk element of the one or more risk elements is associated with one or more objective elements. Further, each risk element of the one or more risk elements is associated with one or more test elements. The elements itself and/or the elements can be assigned to parameters or values, which are referred to as risk-related parameters.

The risk is something that can go wrong during the execution of a system. Accordingly, for example, the risk can be directed to a functional failure or something more abstract like an erroneous system state that influences the response time to a user input.

Each risk threatens one or more objectives of the system under test. For example, if a function behaves other than expected, the objective of a correct function will be threatened. Thus, each risk element is associated with one or more objective elements.

For each risk, one or more tests or test cases can be defined that may uncover faults causing the risk during the operation of the system. Thus, each risk element is associated with one or more test elements.

The resulting meta-model provides a digital format which can be used in a technical system for risk-based testing of a system under test. The risk-based testing can be conducted in an easy, efficient and reliable manner within the technical system. A system in context of this application is any technical system, such as industrial plants and vehicles, including subsystems or components of the system.

In contrast, to the aforementioned manually maintained or generated list, any misinterpretation of textually described risks in the list which lead to inconsistencies as well as the resulting inconsistencies are prevented.

In one aspect, the one or more associated risk-related parameters of the at least one objective element and/or according association is a probability parameter and/or damage parameter. Accordingly, the objectives threatened by a risk have assigned damage parameters. Thus, different objective elements have distinct priorities and each risk can have a different impact on an objective. For example, the objective can be only slightly irritating or disturbing resulting in a low priority. Accordingly, the objectives threatened by a risk have assigned probability parameters. Thus, different objective elements have distinct probability parameters. The risk of a function to work different from being expected depends on a usage profile of that function. For example, some functions are only used rarely.

In another aspect, the one or more associated risk-related parameters of the risk element and/or according association is a test priority number and/or an exposure parameter. Accordingly, the risk elements have assigned exposure parameters. From all the objectives threatened by a risk, an exposure parameter can be calculated for that risk.

In another aspect, the exposure parameter is a product of the damage parameter and the probability parameter. Accordingly, the exposure parameter is a calculated value, in particular the product of some parameters, such as a damage parameter and a probability parameter.

In another aspect, the one or more associated risk-related parameters of the at least one test element and/or according association is a test effectiveness parameter. Accordingly, the test elements have assigned test effectiveness parameters. Each test for a risk can be of a different effectiveness to uncover certain faults. For example, a manual test execution by a human might uncover some bugs, but the effectiveness is much lower than formal mathematical proofs for a program to be correct.

In another aspect, the test priority number is a product of the probability parameter, damage parameter and the test effectiveness. The test priority number of a risk is a calculated value, in particular the product of some aforementioned parameters, such probability parameter, damage parameter and test effectiveness. This parameter provides a criteria or measure for a sufficient test. If all test priority numbers are below a certain threshold, the system will be tested sufficiently.

In another aspect, the method further comprises the steps
Instantiating the at least one risk element, the at least one test element and the at least one objective element to generate respective test instances, objective instances and objective instances specifying a technical system, by a processor, and
Storing the generated respective test instances, objective instances and objective in the computer-readable storage medium.

Accordingly, the method includes instantiating with a processor the three distinct elements, namely the risk elements, test elements and objective elements to create corresponding instances specifying (e.g. describing) a distinct (e.g. specific) part or entity of a technical system. The method also includes storing the instances, e.g. in a computer-readable medium, such as the computer-readable storage medium in which the meta-model is stored.

In a further aspect, instantiating the elements comprises:
constructing the risk instances, test instances and objective instances as objects from classes representing the at least one risk element, the at least one test element and the at least one objective element; or
generating the risk instances, test instances and objective instances as database entries from database content specifying the at least one risk element, the at least one test element and the at least one objective element.

Accordingly, object-oriented programming and/or database programming may be used.

In a further aspect, the method further comprises updating the stored meta-model.

In a further aspect the stored meta-model is extended with at least one second risk element, at least one second test element and/or at least one second objective element depending on at least one test result of risk-based testing.

In a further aspect the at least one risk element, the at least one test element and/or the at least one objective element of the stored meta-model is adapted depending on at least one test result of risk-based testing.

In a further aspect, the at least one associated risk-related parameter of the stored meta-model is adapted depending on at least one test result of risk-based testing, in particular increased or decreased.

Accordingly, the stored meta-model can be adapted or changed since risk-based testing and especially the test results or outcome can change the meta-data for risk-based testing. The update of the meta-model can be performed continuously or in regular intervals to ensure that the meta-model for risk-based testing is kept up-to-date and solely correct as well as valid meta-data is used for risk-based testing. Any element or parameter of the meta-model can be subject to the update. The update refers to any change or adaptation of data, including the extension of the meta-model with data and the deletion of data from the meta-model. For example, new or further elements can be derived from the test results, such as test- risk- and objective elements.

Accordingly, the step of instantiating the elements can be repeated after any update.

A further aspect of embodiments of the invention is a system for performing the described method.

A further aspect of embodiments of the invention is a computer program product (non-transitory computer readable storage medium having instructions, which when executed by a processor, perform actions) directly loadable into an internal memory of a computer, comprising software code portions for performing the steps according to any one of the preceding claims when the computer program product is running on a computer.

BRIEF DESCRIPTION

Some of the embodiments will be described in detail, with reference to the following figures, wherein like designations denote like members, wherein.

DETAILED DESCRIPTION

Figure 1:
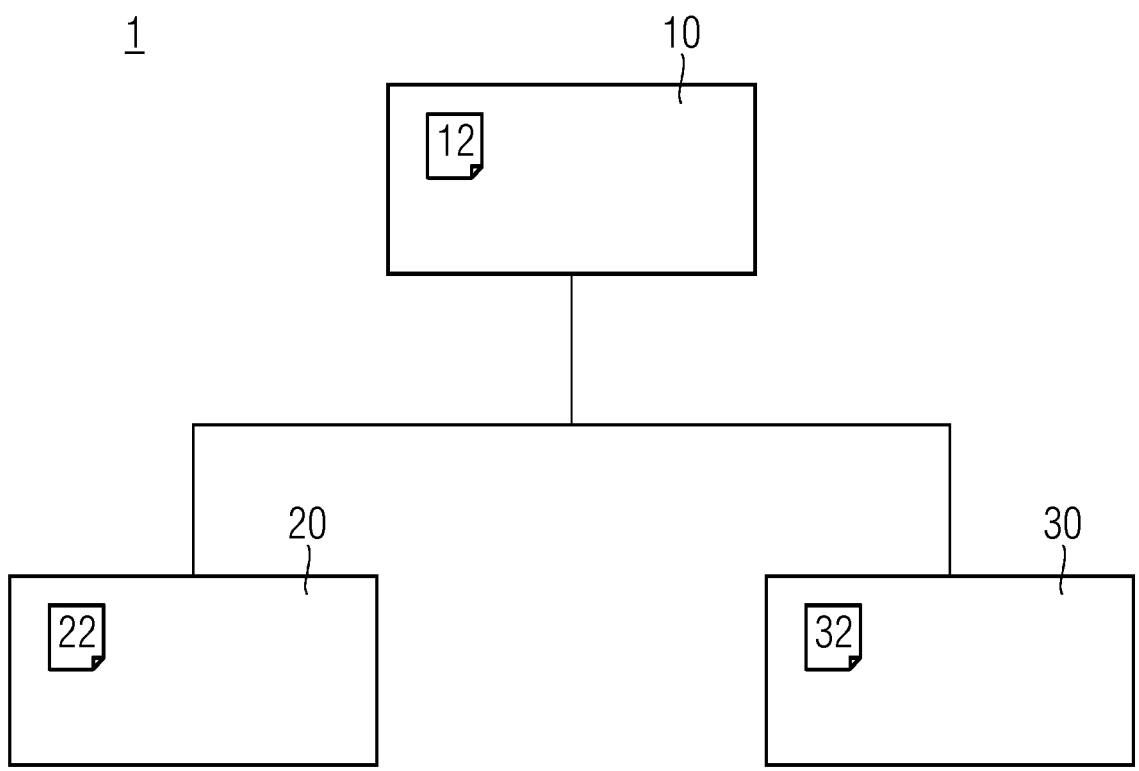
FIG. 1 illustrates a meta-model for risk-based testing according to an embodiment of the present invention.

FIG. 1 shows a schematic diagram of an exemplary meta-model 1 which can be used by the method and the technical system according to different aspects of embodiments of the present invention. The meta-model 1 comprises elements or entities, the risk element 10, the test element 20 and the objective element 30 and their associations. The elements 10, 20, 30 and/or their associations can be associated with risk-related parameters 12, 22, 32.

The meta-model 1 illustrated in FIG. 1 is stored in a computer-readable storage medium. In particular, the meta-model 1 is used for risk-based testing of an underlying system under test or system to be tested. Thereby, the technical system and/or the system under test can comprise subsystems or parts. Accordingly, the system under test or parts of it can be subject to risk-based testing.

Figure 2:
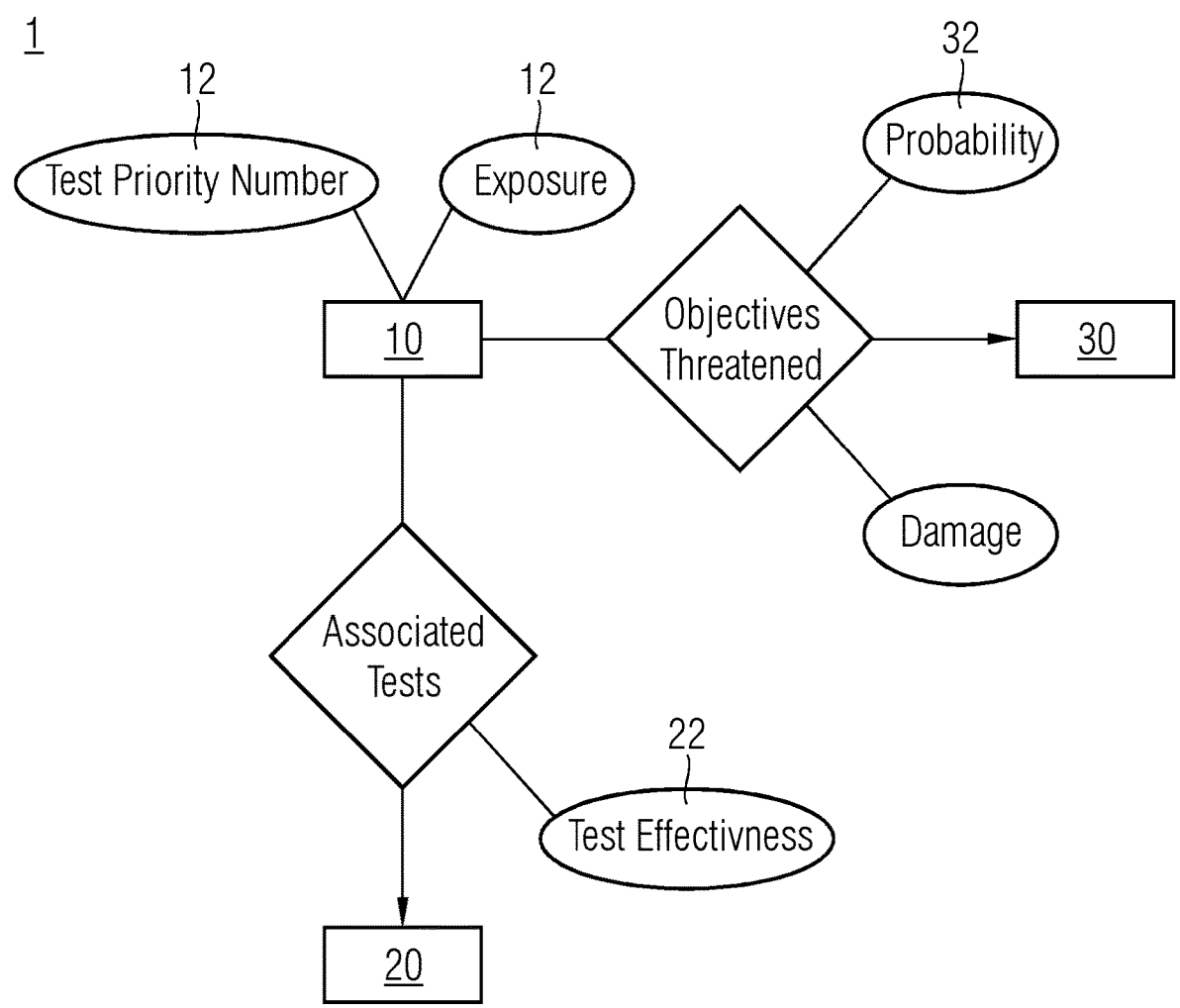
FIG. 2 illustrates a meta-model for risk-based testing according to another embodiment of the present invention.

FIG. 2 shows a different representation of the meta-model 1, wherein the risk-related parameters 12, 22, 32 are presented in more detail. Accordingly, for example, the test element 10 is assigned to the test priority number and exposure as risk-related parameters 12. As depicted, some risk-related parameters are assigned to the elements and some parameters of the parameters are assigned to the associations between the elements.

Figure 3:
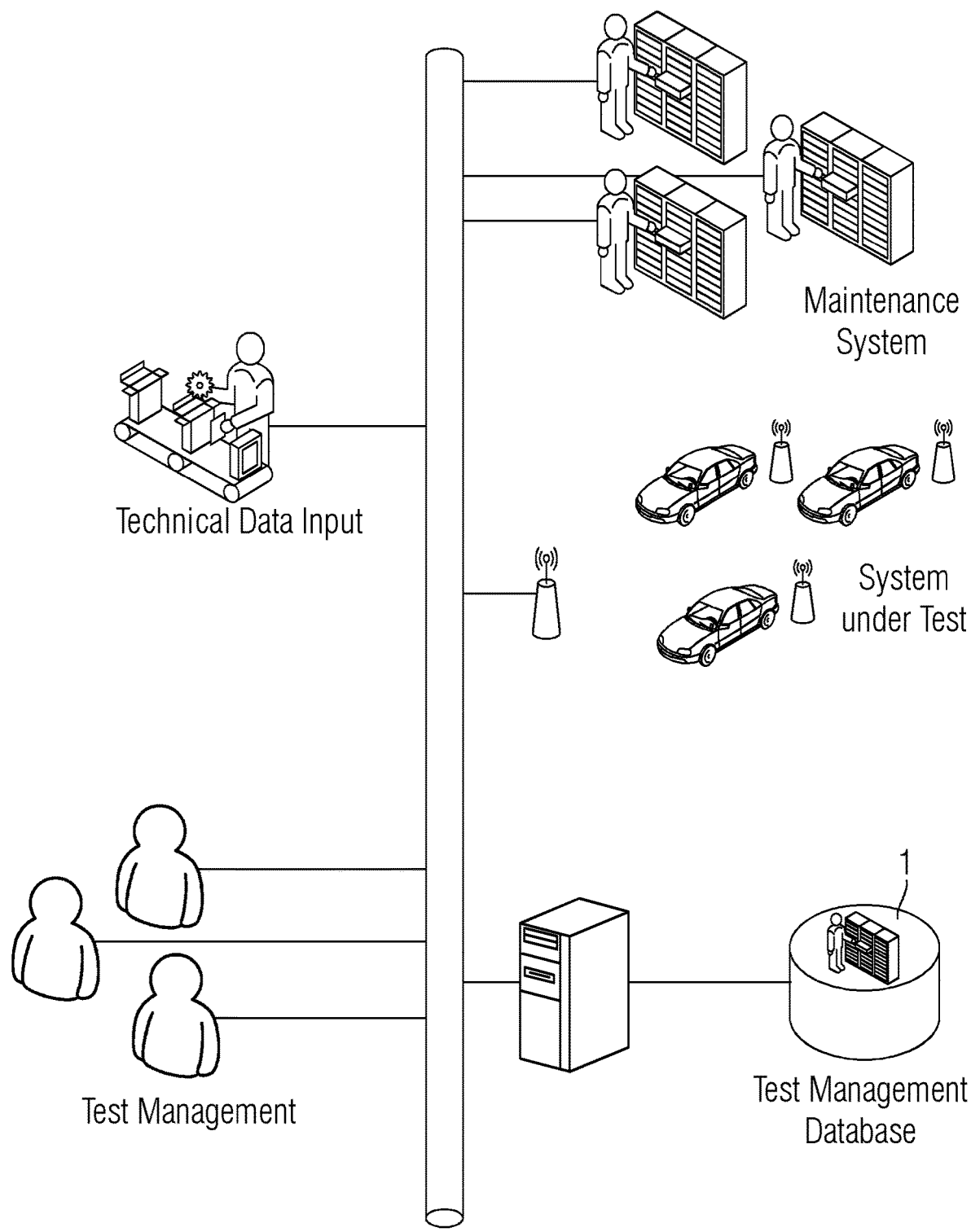
FIG. 3 illustrates a technical system for risk-based testing according to an embodiment of the present invention.

FIG. 3 shows a diagram for illustrating the technical system for supporting the risk-based testing of a system under test. The technical system comprises a database as computer-readable storage medium. The exemplary database is referred to as "Test Management Database". Alternatively, any other storage unit can be used for storing the meta-model 1. The database allows an efficient access to the meta-model.

Test managers can enter input data, in particular the test elements 20. The test managers can also relate the test elements 20 to risk elements 10 and/or objective elements 30. The input data can be entered via an interface or any other means of the technical system into the meta-model 1 by the test managers. In other words, the meta-model 1 can be extended or fed by the additional input data of the test managers or any other experts. Additionally or alternatively, the input data can be transmitted from any computing unit to the computer-readable storage medium automatically and the input data is added to the stored meta-model after reception. The computing unit can be part of the technical system or any other external component outside the technical system.

One or more tests can be automatically executed within the system under test.

Further, the technical system can comprise additional sub-systems or parts, including a maintenance system. The maintenance system can take actions or perform measures, especially with regard to the tested system and the affected sub-systems of the system under test which fail the executed tests.

Exemplary maintenance measures include:
outputting a message which comprises information about the test, other test-related data, the failure or error, the cause of the failure and/or one or more applicable error handling measures to a user of the technical system or system under test,
transmitting the message to a computing unit, and/or
performing one or more applicable error handling measures by the computer unit. The error handling measure can be a correction, such as adaptation of the affected system or sub-system under test, switching off or disabling the affected system.

Feedback Loop

Risk-based testing and more precisely the outcome or results of the associated tests can change the data of the meta-model for risk-based testing, wherein the meta-model comprises the elements and parameters. In other words, any element and/or parameter of the meta-model can be updated, as explained in the following.

In more detail, the test results of an executed test can validate, extend or invalidate the data of the stored meta-model. This change or adaptation can also have an impact on the aforementioned test management and any other applications, such as maintenance.

This way, the meta-model can be advantageously reevaluated and updated using the feedback loop in an efficient and reliable manner.

Moreover, the tests or test cases can be re-prioritized. The new evidence about existing risks and objectives threatened can be also provided to the test managers. The test results can be e.g. be used for bug fixing, which would be the correction of a risk, but also gets new input of objectives threatened from the analysis of text management. Maintenance can also benefit from the validated usage profiles and damage parameters. Further, agile processes are supported using the feedback loop.

Objective Element:

One or more new or additional elements can be derived from the test results. The additional elements extend the meta-model. If a test result does not match the expected result, an objective of the system will be threatened, e.g. to perform a function correctly. The expected result can be defined in a specification.

Accordingly, a new objective element can be derived from a test result.

Risk Element:

One or more new or additional risk elements can be derived from the objective elements. The risk is for example a functional failure. The functional failure threatens an objective of the system, e.g. correct execution.

Accordingly, a new risk element can be derived from an objective element.

Test Effectiveness:

The test result can also have an impact on the test effectiveness. If a test result in many uncovered bugs within a system under test, and the test effectiveness were assumed to be low, the test effectiveness parameter can be increased and vice versa.

Accordingly, the test effectiveness parameter of the meta-model can be adjusted.

Probability:

A test result can also be an adjusted probability parameter for a threatened objective. If during a test the usage profile for a sub-element of a test is executed in a different way than expected, e.g. a tested routine is calling a subroutine more often than expected, this can have an impact on the assumed probability parameter for a threatened objective.

Accordingly, the probability parameter of the meta-model can be adjusted.

Damage Parameter:

The impact of a failed test for the entire system under test becomes more perceptible, especially for end-to-end test or integration testing at higher level.

Accordingly, the damage parameter of the meta-model can be adjusted.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for risk-based testing, the method comprising:
storing, by a processor of a technical system, a meta-model in a computer-readable storage medium of the technical system, wherein:
the meta-model comprises at least one risk element, at least one test element and at least one objective element, and associations between the at least one risk element, the at least one test element, and the at least one objective element,
the at least one risk element is associated with one or more objective elements, and/or the at least one risk element is associated with one or more test elements, and
at least one element of the at least one risk element, the at least one test element, and the at least one objective element and/or at least one association has at least one associated risk-related parameter, and the meta-model provides a digital format which is used in the technical system for risk-based testing of a system under test;

performing, by the processor of the technical system, one or more applicable error handling measures to the system under test that fails an executed test, the one or more applicable error handling measures including an adaptation of the system under test or a sub-system of the system under test, switching off the system under test, or disabling the system under test; and updating, by the processor, the meta-model using a feedback loop of the technical system, the feedback loop comprising results of executed tests.

2. The method according to claim 1, wherein the at least one associated risk-related parameter of the at least one objective element and/or the at least one association is a probability parameter and/or a damage parameter.

3. The method according to claim 1, wherein the at least one associated risk-related parameter of the at least one risk element and/or the at least one association is a test priority number and/or an exposure parameter.

4. The method according to claim 3, wherein the exposure parameter is a product of a damage parameter and a probability parameter.

5. The method according claim 3, wherein the test priority number is a product of a probability parameter, a damage parameter and a test effectiveness parameter.

6. The method according to claim 1, wherein the at least one associated risk-related parameter of the at least one test element and/or the at least one association is a test effectiveness parameter.

7. The method according claim 1, further comprising
instantiating the at least one risk element, the at least one test element and the at least one objective element to generate respective risk instances, test instances, and objective instances specifying a technical system, by a processor, and storing the generated respective test instances, the generated respective objective instances and an objective in the computer-readable storage medium.

8. The method according to claim 7, wherein instantiating the at least one risk element, the at least one test element, and the at least one objective element comprises:
constructing the risk instances, the test instances and the objective instances as objects from classes representing the at least one risk element, the at least one test element and the at least one objective element; or generating the risk instances, the test instances and the objective instances as database entries from database content specifying the at least one risk element, the at least one test element and the at least one objective element.

9. The method according to claim 1, wherein the stored meta-model is extended with at least one second risk element, at least one second test element and/or at least one second objective element depending on at least one test result of risk-based testing.

10. The method according to claim 1, wherein the at least one risk element, the at least one test element and/or the at least one objective element of the stored meta-model is adapted depending on at least one test result of risk-based testing.

11. The method according to claim 1, wherein the at least one associated risk-related parameter of the stored meta-model is increased or decreased depending on at least one test result of risk-based testing.

12. A computer program product, comprising a computer readable hardware storage device having computer readable program code stored therein, said program code executable by a processor of a computer system to implement the method according to claim 1 when the computer program product is running on a computer.

13. A system for risk-based testing, the system comprising:
a processor;

a non-transitory computer-readable storage medium, configured to store a meta-model, wherein:

the meta-model comprises at least one risk element, at least one test element and at least one objective element, and associations between the at least one risk element, the at least one test element, and the at least one objective element, the at least one risk element is associated with one or more objective elements, and/or the at least one risk element is associated with one or more test elements, at least one element of the at least one risk element, the at least one test element, and the at least one objective element and/or at least one association has at least one associated risk-related parameter, and the meta-model provides a digital format which is used in a technical system for risk-based testing of a system under test;

a maintenance system coupled to the processor and the non-transitory computer-readable storage medium that performs one or more applicable error handling measures to the system under test that fails an executed test, the one or more applicable error handling measures including an adaptation of the system under test or a sub-system of the system under test, switching off the system under test, or disabling the system under test; and a feedback loop coupled to the processor that updates the meta-model using results from executed tests.

14. The system according to claim 13, wherein the system further comprises a processor, configured to
instantiate the at least one risk element, the at least one test element and the at least one objective element to generate respective risk instances, test instances and objective instances specifying a technical system, and store the generated respective risk instances, the generated respective test instances and an objective in the computer-readable storage medium.

\* \* \* \* \*